United States Patent [19]

Wigmore et al.

[11] Patent Number: 5,050,389

[45] Date of Patent: Sep. 24, 1991

[54] REFRIGERATION SYSTEM WITH OILESS COMPRESSOR SUPPORTED BY HYDRODYNAMIC BEARINGS WITH MULTIPLE OPERATION MODES AND METHOD OF OPERATION

[75] Inventors: David B. Wigmore, San Diego; John C. Lentz, Poway; Edward S. Blain; Peter D. Waters, both of San Diego, all of Calif.

[73] Assignee: Sundstrand Corporation, Rockford, Ill.

[21] Appl. No.: 550,432

[22] Filed: Jul. 10, 1990

[51] Int. Cl.$^5$ .............................. F25B 43/02
[52] U.S. Cl. ........................... 62/84; 62/175; 62/193; 62/203; 62/227; 62/468; 62/DIG. 2
[58] Field of Search ................. 62/192, 193, 84, 468, 62/469, 470, 473, DIG. 2, 203, 228.1, 226, 227, 228.3, 228.5, 229, 196.1, 196.2, 196.3, 510, 175, 332

[56] References Cited

U.S. PATENT DOCUMENTS

| | | | |
|---|---|---|---|
| 2,949,750 | 8/1960 | Kramer | 62/DIG. 2 |
| 2,986,905 | 6/1961 | Kocher et al. | 62/475 |
| 3,077,086 | 2/1963 | Japhet | 62/DIG. 2 |
| 3,077,087 | 2/1963 | Japhet | 62/DIG. 2 |
| 3,081,606 | 3/1963 | Brose et al. | 62/DIG. 2 |
| 3,221,984 | 12/1966 | Ditzler | 230/207 |
| 3,306,074 | 2/1967 | Wilson | 62/505 |
| 3,422,635 | 1/1969 | Trenkowitz | 62/469 |
| 3,728,857 | 4/1973 | Nichols | 60/36 |
| 4,020,642 | 5/1977 | Haselden et al. | 62/84 |
| 4,598,556 | 7/1986 | Mokadam | 62/117 |
| 4,809,521 | 3/1989 | Mokadam | 62/498 |

OTHER PUBLICATIONS

"A New Technology in Energy-Efficient Electrically Driven Aircraft Environmental Control Systems" authored by W. Cloud, J. McNamara and David B. Wigmore, presented at the 21st IECEC Conference, Aug. 25-29, 1986, Article #869390 American Chemical Society, pp. 1696-1702.

Primary Examiner—Harry B. Tanner
Attorney, Agent, or Firm—Antonelli, Terry, Stout & Kraus

[57] ABSTRACT

A refrigeration system (10) having a compressor rotor (20) rotatably supported by a plurality of hydrodynamic bearings (22 and 24) lubricated by oiless pressurized liquid refrigerant and pressurizing refrigerant which flows to a condenser (34) providing liquid refrigerant which flows to an evaporator (68) in fluid communication with the condenser and the compressor in accordance with the invention includes a refrigeration circuit (36) coupled to the compressor, for providing pressurized refrigerant to the hydrodynamic bearings from the compressor and to the evaporator; a bearing pump (26), coupled to the refrigerant circuit and to the condenser, for providing pressurized refrigerant to the refrigeration circuit; a first temperature sensor (101) sensing a temperature Tsink of a heat exchange fluid at the condenser and providing a temperature signal representative of the temperature Tsink of the heat exchange fluid at the condenser; a second heat exchange sensor (103) sensing a temperature Tsource of a heat exchange fluid at the evaporator and providing a temperature signal representative of the temperature Tsource of the heat exchange fluid at the evaporator; and a controller (28), coupled to the temperature sensors, for controlling activation of the compressor and bearing pump as a function of the temperature signals to provide for three modes of operation with the first mode of operation being activation of only the compressor, the second mode of operation being activation of the bearing pump and the compressor and the third mode of operation being activation of only the bearing pump.

27 Claims, 2 Drawing Sheets

EXAMPLE OF MODE DEFINITION
WITH TSOURCE (TEMP AT EVAPORATOR) = 45°F

TSOURCE - TSINK < TDIFF.

COMPRESSOR ONLY
MODE 1

TDIFF. 1 = -25°F
TDIFF 2 = +35°F

70°F

TDIFF 1 ≤ (TSOURCE - TSINK) < TDIFF 2

COMPRESSOR
AND
PUMP
MODE 2

10°F

↑ TSINK

| TSINK (°F) | (TSOURCE - TSINK) (°F) | MODE |
|---|---|---|
| 71 | -26 | 1 |
| 70 | -25 | 2 |
| 69 | -24 | 2 |
| ≀ | ≀ | 2 |
| | | 2 |
| | | 2 |
| | | 2 |
| 11 | 34 | 2 |
| 10 | 35 | 3 |
| 9 | 36 | 3 |

PUMP ONLY
MODE 3

(TSOURCE - TSINK) ≥ TDIFF.2

REFRIGERATION SYSTEM WITH OILESS COMPRESSOR SUPPORTED BY HYDRODYNAMIC BEARINGS WITH MULTIPLE OPERATION MODES AND METHOD OF OPERATION

CROSS-REFERENCE TO RELATED APPLICATIONS

Reference is made to patent application Ser. No. 550,544, entitled "Bearing Pump Control for Lubricating Hydrodynamic Compressor Bearings" filed on even date herewith, which is assigned to the Assignee of the present invention, which application is incorporated by reference in its entirety; and to Patent application Ser. No. 550,867, entitled "Superheat Sensor With Single Coupling To Fluid Line", filed on even date herewith, which is assigned to the Assignee of the present invention, which application is incorporated herein by reference in its entirety; and to Patent application Ser. No. 550,433, entitled "Vapor Cycle Cooling System Having a Compressor Rotor Supported With Hydrodynamic Compressor Bearings", filed on even date herewith, which is assigned to the Assignee of the present application, which application is incorporated herein by reference in its entirety; and to Patent application Ser. No. 550,506, entitled "Hydrodynamic Bearing Protection System and Method", filed on even date herewith, which is assigned to the Assignee of the present invention, which application is incorporated herein by reference in its entirety; and to Patent application Ser. No. 550,458, entitled "Speed Control of a Variable Speed Aircraft Vapor Cycle Cooling System Condenser Fan and Compressor and Method of Operation", filed on even date herewith, which is assigned to the Assignee of the present invention, which application is incorporated herein by reference in its entirety;

Patent application Ser. No. 550,434, entitled "Control System For Controlling Surge As a Function of Pressure Oscillations and Method", filed on even date herewith, which is assigned to the Assignee of the present invention, which application is incorporated herein by reference in its entirety; and to Patent application Ser. No. 550,631, entitled "Vapor Cycle System Evaporator Control" filed on even date herewith, which is assigned to the Assignee of the present invention, which application is incorporated herein by reference in its entirety.

Description

1. Technical Field

The present invention relates to refrigeration systems which do not include oil within the refrigerant.

2. Background Art

An article entitled "A New Technology in Energy-Efficient Electrically Driven Aircraft Environmental Control Systems", authored by W. Cloud, J. McNamara and David B. Wigmore, presented at the 21st IECEC Conference, Aug. 25-29, 1986, discloses a vapor cycle cooling system for airframes having a multiple stage compressor with multiple subcoolers for cooling the temperature of a non-azeotropic binary refrigerant. The disclosed system does not disclose that the refrigerant may be used to lubricate hydrodynamic bearings supporting the compressor rotor. Furthermore, the disclosed system does not contain a bearing pump for providing pressurized lubricant to hydrodynamic bearings. Finally, the disclosed system is not disclosed as having multiple modes of operation in which a compressor and/or bearing pump is operated to provide pressurized liquid refrigerant to the evaporator.

U.S. Pat. No. 4,598,556, which is assigned to the assignee of the present invention, discloses a high efficiency refrigeration system in which a non-azeotropic binary refrigerant is used. The disclosed system has a multiple stage compressor. Multiple heat exchangers are provided in series with the refrigeration output from the condenser for cooling the refrigerant prior to expansion by the evaporator.

U.S. Pat. No. 4,809,521, which is assigned to the assignee of the present invention, discloses a high efficiency cooling system utilizing non-azeotropic binary refrigerant having a single stage compressor. A plurality of heat exchangers are coupled between the output of the condenser and the evaporator for cooling the refrigerant prior to expansion by the evaporator.

U.S. Pat. No. 3,221,984 discloses an oil supply system for a compressor in a refrigeration system. The oil supply system provides pressurized oil to the bearings of the compressor after the compressor motor is de-energized while the compressor is still rotating at high speed. The rotational inertia of the compressor applies pressurized gas from the compressor to an oil tank above the oil level which forces oil to flow to the bearings of the compressor for a period sufficient for the compressor to stop rotating.

Compressors are known which utilize oiless refrigerant to lubricate bearings. See U.S. Pat. Nos. 3,728,875 and 4,020,642. U.S. Pat. No. 4,020,642 discloses a bearing pump integral with the compressor shaft which pressurizes liquid refrigerant flowing from the condenser prior to application to the bearings. The bearing pump is powered by rotation of the compressor and therefore cannot be separately activated.

DISCLOSURE OF INVENTION

The present invention is a refrigeration system and method of operation in which an oiless refrigerant is supplied to hydrodynamic bearings which rotatably support a compressor rotor and to an evaporator from a compressor and/or bearing pump under different operation modes in which the bearing pump and/or the compressor are activated. The operation of the bearing pump and compressor is controlled by a controller as a function of a sensed temperature Tsink of a heat exchange fluid at a condenser (sink temperature) and a sensed temperature Tsource of a heat exchange fluid at the evaporator (source temperature).

A first mode of operation is when only the compressor is activated; a second mode of operation is when the bearing pump and compressor are activated; and a third mode of operation is when only the bearing pump is activated. The first mode of operation occurs when Tsource−Tsink)<TDiFF1 with TDiFF1 being a temperature difference. The second mode occurs when TDiFF1≦(Tsource−Tsink)<TDiFF2 with TDiFF1 being a first temperature difference and TDiFF2 being a second temperature difference. The third mode occurs when (Tsource−Tsink)≧TDiFF2 with TDiFF2 being a temperature difference. The temperature differences TDiFF1 and TDiFF2 are primarily determined by analysis of the condenser and evaporator heat loads and the relative operating temperatures of the heat exchange fluids at the condenser and evaporator.

The present invention provides multiple modes of operation which are controlled as a function of the temperature of the heat exchange fluids at the condenser and evaporator which minimizes consumption of energy in situations where the flow of refrigerant provided by only the bearing pump is sufficient to provide the necessary cooling of the heat exchange fluid at the evaporator; provides a sufficient flow of liquid refrigerant to the hydrodynamic bearings to avoid damage to the journals of the compressor rotor and to the evaporator to control the temperature of the heat exchange fluid at the evaporator while running only the compressor; and provides compressed refrigerant to the hydrodynamic bearings and the evaporator by activating the pump and the compressor when the flow of refrigerant from the compressor is insufficient to maintain pressurized fluid at the hydrodynamic bearings and at the evaporator to maintain a necessary temperature of the heat exchange fluid at the evaporator.

A refrigeration system having a compressor rotor rotatably supported by a plurality of hydrodynamic bearings lubricated by oiless pressurized liquid refrigerant and pressurizing refrigerant which flows to a condenser providing liquid refrigerant which flows to an evaporator in fluid communication with the condenser and the compressor in accordance with the compressor includes a refrigerant circuit, coupled to the compressor, for providing pressurized liquid refrigerant to the hydrodynamic bearings from the compressor; a bearing pump, coupled to the refrigerant circuit and to the condenser for providing pressurized refrigerant at a pressure higher than a pressure of the refrigerant provided by the compressor rotor when the bearing pump is operating; a first temperature sensor sensing a temperature Tsink of a heat exchange fluid at the condenser and providing a temperature signal representative of the temperature Tsink of the heat exchange fluid at the condenser; a second heat exchange sensor sensing a temperature Tsource of a heat exchange fluid at the evaporator and providing a temperature signal representative of the temperature Tsource of the heat exchange fluid at the evaporator; and a controller, coupled to the temperature sensors, for controlling activation of the compressor and bearing pump as a function of the temperature signals representative of Tsink and Tsource to provide for three modes of operation with the first mode of operation being activation of only the compressor, the second mode of operation being activation of the bearing pump and the compressor and the third of mode of operation being activation of only the bearing pump. The first mode of operation occurs when (Tsource−Tsink)<TDiFF1 with TDiFF1 being a temperature difference; the second mode of operation occurs when TDiFF1≦(Tsource−Sink)<TDiFF2 with TDiFF1 being a first temperature difference and TDiFF2 being a second temperature difference; and the third mode of operation occurs when (Tsource−Tsink)≧TDiFF2 with TDiFF2 being a temperature difference.

A refrigeration system having a compressor rotor rotatably supported by a plurality of hydrodynamic bearings lubricated by oiless pressurized liquid refrigerant and pressurizing refrigerant which flows to a condenser providing liquid refrigerant which flows to an evaporator in fluid communication with the condenser and the compressor in accordance with the invention includes a refrigerant circuit, coupled to the compressor, for providing pressurized liquid refrigerant to the hydrodynamic bearings from the compressor and to the evaporator; a bearing pump, coupled to the refrigerant circuit and to the condenser, for providing pressurized refrigerant to the refrigerant circuit; a first temperature sensor sensing a temperature Tsink of a heat exchange fluid at the condenser and providing a temperature signal representative of the temperature Tsink of the heat exchange fluid at the condenser; a second heat exchange sensor sensing a temperature Tsource of a heat exchange fluid at the evaporator and providing a temperature signal representative of the temperature Tsource of the heat exchange fluid at the evaporator; and a controller for controlling activation of the compressor and bearing pump as a function of the temperature signals representative of Tsink and Tsource and providing a mode of operation with only the bearing pump being activated to cause refrigerant to flow through the evaporator to cool the heat exchange fluid at the evaporator. The bearing pump is activated under the control of the controller when (Tsource−Tsink)≧TDiFF2 with TDiFF2 being a temperature difference.

Further in accordance with the invention, the compressor is a multiple stage compressor and the invention further includes a first subcooler and a first expansion valve contained in the refrigerant circuit, the first expansion valve expanding refrigerant flowing from the first subcooler to cool refrigerant flowing through the first subcooler and refrigerant flowing from the first subcooler after expansion by the first expansion valve flowing to an interstage point in the compressor through which compressed gas flows from one stage to another stage. The refrigerant flows through the refrigerant circuit from the first subcooler after being cooled by the subcooler to the hydrodynamic bearings. A second subcooler and a second expansion valve are contained in the refrigerant circuit which receive liquid refrigerant flowing from the first subcooler, the second expansion valve expanding refrigerant flowing from the second subcooler to cool refrigerant flowing through the second subcooler and refrigerant flowing from the second subcooler after cooling by the second subcooler flowing to the hydrodynamic bearings and then to the evaporator and the expanded refrigerant flowing from the second subcooler flowing to the inlet of the compressor; and wherein the refrigerant is a non-azeotropic binary refrigerant.

A method of operating a refrigeration system having a compressor rotor rotatably supported by a plurality of hydrodynamic bearings lubricated by pressurized liquid refrigerant provided from at least one of a bearing pump and the compressor rotor and pressurizing refrigerant which flows to the condenser providing liquid refrigerant which flows to an evaporator in fluid communication with the condenser and the compressor in accordance with the invention includes sensing a temperature Tsink of a heat exchange fluid at the condenser; sensing a temperature Tsource of a heat exchange fluid at the evaporator; and controlling activation of the bearing pump and the compressor as a function of the temperatures Tsink and Tsource to provide three modes of operation with the first mode of operation being activation of only the compressor, the second mode of operation being activation of the bearing pump and the compressor and the third mode of operation being activation of only the bearing pump. The first mode of operation occurs when (Tsource−Tsink)<TDiFF1 with TDiFF1 being a temperature difference; the second mode of operation occurs when $\text{TDiFF1} \leq (\text{Tsource} - \text{Tsink}) < \text{TDiFF2}$ with TDiFF1 being a first temperature difference and TDiFF2 being a second temperature difference; and the third mode of operation occurs when $(\text{Tsource} - \text{Tsink}) \geq \text{TDiFF2}$ with TDiFF2 being a temperature difference.

A method of operating a refrigeration system having a compressor rotor rotatably supported by a plurality of hydrodynamic bearings lubricated by pressurized liquid refrigerant provided from at least one of a bearing pump and the compressor and pressurizing refrigerant which flows to the condenser providing liquid refrigerant which flows to an evaporator in fluid communication with the condenser and the compressor in accordance with the invention includes sensing a temperature Tsink of a heat exchange fluid at the condenser; sensing a temperature Tsource of a heat exchange fluid at the evaporator; and controlling activation of the bearing pump and the compressor as a function of the temperatures and providing a mode of operation with only the bearing pump being activated to cause refrigerant to flow through the evaporator to cool the heat exchange fluid at the evaporator. The bearing pump is activated under the control of the controller when $(\text{Tsource} - \text{Tsink}) \geq \text{TDiFF2}$ with TDiFF2 being a temperature difference.

BEST MODE FOR CARRYING OUT THE INVENTION

Figure 1:
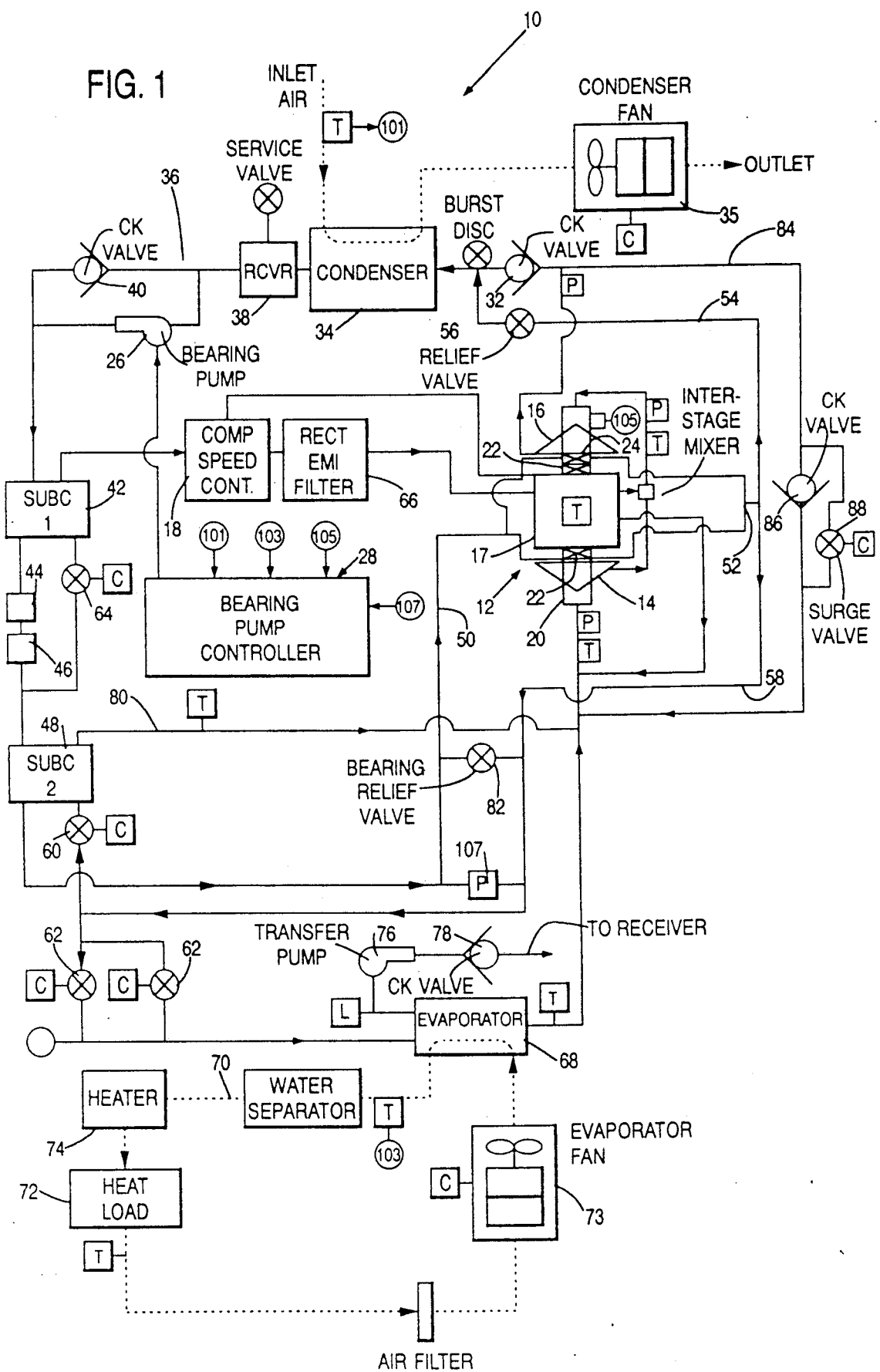
FIG. 1 illustrates a refrigeration system in accordance with the present invention.

FIG. 1 illustrates a refrigeration system 10 in accordance with the present invention which is operable with three distinct modes of operation. The first mode of operation is the activation of only the compressor 12 to supply pressurized liquid refrigerant flowing from the condenser 34 to hydrodynamic radial bearings 22 and a hydrodynamic thrust bearing 24 and to a remainder of the system including expansion valves 62 for cooling evaporator 68. The conditions for activating only the compressor are described below. The second mode of operation is the activation of the compressor 12 and bearing pump 26 to provide pressurized liquid refrigerant to the hydrodynamic radial bearings 22 and the hydrodynamic thrust bearing 24 and the remainder of the refrigeration system including the expansion valves 62 and the evaporator 68. The conditions for activating the compressor 12 and the bearing pump 26 are described below. The third mode of operation is the activation of only the bearing pump 26 to provide pressurized liquid refrigerant to the hydrodynamic radial bearings 22 and the hydrodynamic thrust bearing 24 and the remainder of the refrigeration system including the expansion valves 62 and the evaporator 68. The activation of the system for the foregoing three modes of operation is controlled by the sensing of a first temperature sensor 101 sensing a temperature Tsink of a heat exchange fluid at the condenser 34 which provides a temperature signal representative of the temperature Tsink of the heat exchange fluid at the condenser and a second sensor 103 which senses a temperature Tsource of a heat exchange fluid at the evaporator and provides a temperature signal representative of the temperature Tsource of the heat exchange fluid at the evaporator 68. A compressor and bearing pump controller 28 processes the foregoing temperature signals to control the activation of a compressor 12 and the bearing pump 26 as described below.

A preferred application of the refrigeration system 10 is cooling avionics on an airframe. While the invention is not limited thereto, the system of FIG. 1 utilizes a non-azeotropic binary refrigeration fluid. A centrifugal compressor is comprised of two compressor stages 14 and 16 which are driven by a high-speed electrical motor 17 that runs at a rotational velocity of up to 70,000 rpm. The motor 17 is driven by a speed control 18 of the type described in U.S. patent application Ser. Nos. 319,719, 319,727 and 320,224, which are assigned to the Assignee of the present invention. The rotor on which the compressor stages 14 and 16 are mounted is supported by the aforementioned pair of hydrodynamic radial bearings 22 and a hydrodynamic thrust bearing 24. A hydrodynamic bearing, which is well known, separates surfaces moving relative to each other with a lubricant which is pressurized from a pressure source. The structure of the hydrodynamic radial and thrust bearings is not illustrated for the reason that it is conventional and does not form part of the present invention.

The hydrodynamic radial and thrust bearings 22 and 24 are maintained by pressurized oiless liquid state refrigerant which is provided from two sources. The first source is from the second stage 16 of the compressor 12 and the second source is from the bearing pump 26 which is activated by the compressor and bearing pump controller 28 in accordance with predetermined conditions of operation of the refrigeration system which are based upon sensed operational parameters as described below. The function of the bearing pump 26 is to make up for a deficiency in the pressure and quantity of refrigerant outputted from the second stage 16 of the compressor 12 which is necessary to maintain the hydrodynamic radial and thrust bearings 22 and 24 during predetermined operational conditions of the refrigeration system 10 and is the only source of pressurized refrigerant during an economy mode in which the compressor is not operated. The bearing pump outputs pressurized refrigerant at a pressure higher than the output pressure of the second stage 16 of the compressor 12 when the compressor and bearing pump 26 is activated by the compressor and bearing pump controller 28.

The flow of refrigerant through the refrigeration system 10 is described as follows: Pressure and temperature transducers which are located at various points in the system, are identified by a squarebox respectively containing the letters "P" and "T". Control signals apply to controllable expansion valves which are provided from the compressor and bearing pump controller 28 are identified by a squarebox labelled with the letter "C". A squarebox containing the letter "L" is a liquid level sensor providing a signal to the compressor and bearing pump controller 28. The connections of the liquid level sensor and pressure and temperature transducers to the compressor and bearing pump controller 28 have been omitted for purposes of clarity in the drawings. Pressurized refrigerant flows from the second stage 16 of the compressor 12 through check valve 32 to condenser 34 at which the pressurized refrigerant gas is condensed to liquid. A first heat exchange fluid, which in this application is air, but the invention is not limited thereto, flows in a counterflow direction through the condenser 34 under suction created by a condenser fan 35 to remove heat from the refrigerant and cause the refrigerant to condense to liquid. The refrigerant is outputted by the condenser 32 to a refrigerant circuit 36 which couples the condenser to the radial and thrust hydrodynamic bearings 22 and 24 through a flow path including receiver 38, check valve 40, a first subcooler 42, filter dryer 44, sight glass 46, a second subcooler 48 and from the output of the second subcooler 48 through line 50 to the input to the radial and thrust hydrodynamic bearings 22 and 24. The liquid refrigerant discharged from the radial and hydrodynamic bearings 22 and 24 is combined at point 52. The liquid refrigerant flows from point 52 in a first path 54 when the relief valve 56 is opened to the input of the condenser 34 and through a second path 58 to an expansion valve 60 and, while the invention is not limited thereto, to a pair of parallel connecting expansion valves 62. The relief valve 56 is opened when the valves 60 and 62 are closed.

The subcooler 42 functions to cool liquid refrigerant outputted by the receiver 38 to a temperature determined by expansion valve 64 which controls the superheat at the inlet of the second stage 16 of the compressor 12. The expanded refrigerant outputted by the expansion valve 64 cools the liquid refrigerant flowing into the subcooler 42. The gaseous refrigerant flowing from the subcooler 42 cools the electronics contained in the compressor speed control 18 and the electronics contained in the rectifier and EMI filter 66 which are components used for driving the electrical motor 17.

The expansion valves 60 and 62 perform different functions. The expansion valve 60 controls the superheat at the output of the subcooler 48. The expansion valve 62 may perform one of two functions. The first function is the controlling of the superheat out of the evaporator 68 which cools air flowing in a direction counter to the flow of refrigerant through the evaporator in an airflow path 70 which cools an avionics heat load 72. The second function is the control of the air temperature out of the evaporator. Only one function may be performed at a time. Fan 73 provides the pressure head to cause air to circulate in the airflow path 70. Optionally, a heater 74, which may have multiple stages, but is not limited thereto, may be provided in the airpath 70 when cooling of the heat load 72 which may be avionics is not necessary. The evaporator 68 is coupled to the receiver through a transfer pump 76 and a check valve 78.

A function of the second subcooler 48 pertinent to this embodiment of the invention is to lower the temperature of liquid refrigerant flowing out of the first subcooler to a temperature at which the refrigerant will maintain a liquid state flowing through the hydrodynamic radial and thrust bearings 22 and 24 after absorbing heat therein. The cold side output 80 from the second subcooler 48 combines with the output from the evaporator 68 and supplies the input to the first stage 14 and the compressor.

A bearing relief valve 82 bypasses the hydrodynamic radial and thrust bearings 22 and 24 when the pressure across the bearings reaches a predetermined maximum pressure, such as 50 psi, to avoid dropping excessive pressure across the hydrodynamic radial and thrust bearings 22 and 24 which may damage the bearings. A $\Delta P$ pressure transducer 107 senses when the pressure drop across the radial and thrust bearings 22 and 24 is less than 18 psi. The function of the $\Delta P$ pressure transducer 107 is described in U.S. patent application Ser. No. 050,544, entitled "Bearing Pump Control For Lubricating Hydrodynamic Compressor Bearings".

The output from the second stage 16 of the compressor may flow through a fluid circuit 84 which contains a parallel connection of a check valve 86 and a surge valve 88. These valves permit recirculation of refrigerant from the output stage 16 back to the input stage of the compressor during surge conditions in a manner which is well-known. The control of the surge valve 88 is disclosed in patent application Ser. No. 550,434, entitled "Control System For Controlling Surge As A Function of Pressure Oscillations and Method" filed on even date herewith.

One of the functions of the bearing pump 26 is to provide supplemental pressurized refrigerant to the hydrodynamic radial and thrust bearings 22 and 24 under conditions of operation of the compressor 12 where the output pressure from the second stage is insufficient to maintain the necessary minimum pressure and flow rate to the hydrodynamic radial and thrust bearings. The compressor and bearing pump controller 28 activates the bearing pump 26 in accordance with predetermined conditions of operation of the refrigeration circuit 10 as described in detail in U.S. patent application Ser. No. 550,544 entitled "Bearing Pump Control For Lubricating Hydrodynamic Compressor Bearings", filed on even date herewith. The activation of the bearing pump 26 is controlled as a function of temperatures sensed by temperature sensors 101 and 103 which respectively sense the temperature Tsink of the heat exchange fluid at the condenser 34 and the temperature Tsource of the heat exchange fluid at the evaporator 68, the speed of rotation of the rotor 20 as sensed by speed sensor 105 and the pressure drop across the hydrodynamic bearings 22 and 24 as sensed by $\Delta P$ sensor 107.

The operation of the compressor and bearing pump controller 28 in producing the three modes of operation is described as follows:

Mode 1

The first mode of operation is when only the compressor 12 is activated under the control of the compressor and bearing pump controller 28. The predetermined pressure conditions for activating the compressor 12 are that (Tsource−Tsink)<TDiFF1 with Tsink being the temperature of the heat exchange fluid flowing to the condenser 34 sensed by sensor 101 and Tsource being the temperature of the heat exchange fluid flowing to the evaporator 68 sensed by sensor 103 and TDiFF1 being a temperature difference determined by analysis and testing as described below.

The following sequence of events occurs during activation of the refrigeration system during the first mode of operation:

1. The condenser fan 35 is activated to cause the heat exchange fluid to flow through the condenser 34.
2. The expansion valves 60 and 62 are closed.
3. The surge valve 88 is closed.
4. The bearing pump 26 is activated to cause liquid refrigerant to flow from the condenser 34 through the receiver 38 through the bearing pump 26 through the subcooler 42 through the subcooler 48 through the hydrodynamic radial and thrust bearings 22 and 24 and to the condenser 34.
5. The compressor 12 is activated to a minimum operating speed which provides stable operation of the rotating assembly.

6. Expansion valves 60 and 64 are modulated toward the open position and are controlled to a steady state for the desired superheat conditions at the inlet to the first and second compressor stages 14 and 16. The flow path of refrigerant is from the condenser 34 through the receiver 38 through the bearing pump 26 through the subcooler 42 through the subcooler 48 through the hydrodynamic radial and thrust bearings 22 and 24 to the point 52 and back to the expansion valve 60 through the subcooler 48 back to the inlet of the compressor. Additionally, liquid refrigerant flowing from the first subcooler 42 flows through the expansion valve 64 and through the compressor speed control 18 and the rectifier and EMI filter 66 to cool the electronics therein to the interstage point 53 of the compressor and from the outlet of the second stage of the compressor to the condenser 34.

7. The heat load is applied to the evaporator by activating the blower 73.

8. The expansion valves 62 are modulated toward the open position and the compressor speed is modulated and the surge valve 88 is opened for a desired heat source supply temperature and superheat at the outlet of the evaporator 68.

9. The bearing pump 26 is deactivated. The flow path is as described above with regard to step 6 except that the bearing pump flow is bypassed. Turning off the system in Mode 1 is in the reverse sequence of turning on the system.

Mode 2

The second mode of operation is with the bearing pump 26 and the compressor 12 both activated. The second mode of operation occurs when TDiFF1≦(Tsource−Tsink)<TDiFF2 with Tsink being the temperature of the heat exchange fluid at condenser 34 sensed by sensor 101 and Tsource being the temperature of the heat exchange fluid at the evaporator 68 sensed by sensor 103 with TDiFF1 being a first temperature difference and TDiFF2 being a second temperature difference determined by analysis and testing as described below. The operation of the refrigeration system with the compressor 12 and the bearing pump 26 activated is identical to that described above in Mode 1 except that the ninth step of de-energizing the pump does not occur. Turning off of the system in Mode 2 is the reverse of the turning on of the system.

Mode 3

The third mode is when only the bearing pump 26 is activated. The third mode occurs when (Tsource−Tsink)≧TDiFF2 with Tsink being the temperature of the heat exchange fluid at the condenser 34 sensed by sensor 101 and Tsource being the temperature of the heat exchange fluid at the evaporator 68 sensed by sensor 103 with TDiFF2 being a temperature difference determined by analysis and testing as described below.

Operation of the refrigeration system in an economy mode is described as follows:

1. The condenser fan 35 is activated to cause the heat exchange fluid to flow through the condenser 34.

2. The expansion valves 60 and 62 are closed.

3. The surge valve 88 is closed.

4. The bearing pump 26 is activated to cause liquid refrigerant to flow from the condenser 34 through the receiver 38 through the bearing pump 26 through the subcooler 42 through the subcooler 48 through the hydrodynamic radial and thrust bearings 22 and 24 and to the condenser 34.

5. The blower 73 is activated to apply the heat load to the evaporator 68.

6. The expansion valve 62 is modulated towards the open position to control the desired heat source supply temperature. The flow of refrigerant is from the condenser 34 through the receiver 38 through the bearing pump 26 through the subcooler 42 through the subcooler 48 through the hydrodynamic radial and thrust bearings 22 and 24 from point 52 back through line 58 to the expansion valve 62 and through the evaporator 68 and from the evaporator 68 through the check valves 86 and the check valve at the inlet to the condenser 34. This mode can save substantial energy as a consequence of not operating the compressor 12 when the temperature difference between the evaporator and the condenser 34 are of the correct magnitude.

The method of operating the refrigeration system of FIG. 1 with the compressor rotor 20 rotatably supported by hydrodynamic bearings 22 and 24 lubricated by pressurized liquid refrigerant provided from at least one of the bearing pump 26 and the compressor rotor and pressurizing refrigerant which flows to the condenser 34 providing liquid refrigerant which flows to the evaporator 68 in fluid communication with the condenser and the compressor in accordance with the invention includes sensing a temperature Tsink of a heat exchange fluid at the condenser with sensor 101; sensing a temperature Tsource of heat exchange fluid at the evaporator with heat sensor 103 and controlling activation of the bearing pump 26 and compressor 12 as a function of the temperatures to provide three modes of operation with the first mode of operation being activation of only the compressor, the second mode of operation being activation of the bearing pump and the compressor and third mode of operation being activation of only the bearing pump. The first mode of operation occurs when (Tsource−Tsink)<TDiFF1 as described above and below; the second mode of operation occurs when TDiFF1≦(Tsource−Tsink)<TDiFF2 as described above and below; and the third mode of operation occurs when (Tsource−Tsink)≧TDiFF2 as described above and below.

A method of operating the refrigeration system 10 with the compressor rotor 20 rotatably supported by a plurality of hydrodynamic radial and thrust bearings 22 and 24 lubricated by pressurized liquid refrigerant provided from at least one of a bearing pump 26 and the compressor rotor and pressurizing refrigerant which flows to the condenser 34 providing liquid refrigerant which flows to the evaporator 68 in fluid communication with the condenser and the compressor 12 in accordance with the invention includes sensing the temperature Tsink of the heat exchange fluid at the condenser 34 with sensor 101; sensing a temperature Tsource of a heat exchange fluid at the evaporator 68 with sensor 103; and controlling activation of the bearing pump 26 and the compressor as a function of the temperatures and providing a mode of operation with only the bearing pump being activated to cause refrigerant to flow through the evaporator to cool the heat exchange fluid at the evaporator. The bearing pump is activated when (Tsource−Tsink)≧TDiFF2 as described above and below.

The temperature differences TDiFF1 and TDiFF2 are determined by thermodynamic analysis and verified by test. The primary factors in the thermodynamic analysis for determining TDiFF1 and TDiFF2 are the heat loads at the condenser 34 and evaporator 68 and the type of refrigerants being used. However, other facts which may be considered in the thermodynamic analysis are the expansion valve size, the compressor pressure ratio of inlet to outlet pressure for a given flow rate, compressor bearing size with respect to the ability of larger bearings to operate at lower pressure, heat exchanger sizes, and refrigerant piping size.

The foregoing system characteristics in their totality or only a selected number thereof, such as heat loads and refrigerant type, are used to produce a thermodynamic model of the system including its components. Solution to the model is used to determine at what temperature TDiFF2 the bearing pump 26 alone with the heat sink temperature below the heat source temperature will be able to provide the required cooling to switch between mode 2 and 3 and solution to this model is used to determine at what temperature TDiFF1 insufficient pressure exists at the condenser 34 only for the compressor 12 to supply flow through the expansion valves 62 to maintain temperature of the heat source fluid in the evaporator. For simplicity, the temperature difference TDiFF1 and TDiFF2 may be constants. Alternatively, for systems which experience large excursions of evaporator heat load, the temperature TDiFF1 and/or TDiFF2 may be represented by algorithms which relate their values in a time varying manner to one or more of the above-identified variables of the system.

The present invention is not limited to applications involving a binary non-azeotropic refrigerant. A single refrigerant may be used where low subcooling is not required in which case the subcooler 48 and expansion valve 60 may be omitted from the system. Furthermore, a single refrigerant may be used with a single stage compressor in which case the subcooler 42 and expansion valve 64 may be omitted from the system. Finally, the flow of liquid refrigerant from the hydrodynamic bearings 22 and 24 may be taken and returned upstream of the expansion valve 64 which is the subject matter of patent application Ser. No. 550,433, entitled "Vapor Cycle Cooling System Having a Compressor Rotor Supported With Hydrodynamic Compressor Bearings", filed on even date herewith.

Figure 2:
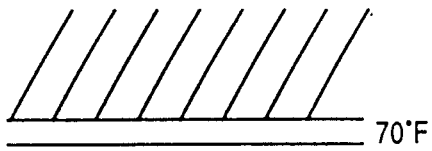
FIG. 2 illustrates an example of the multimode operation of the present invention for a set TDiFF1 and TDiFF2.
Figure 2:
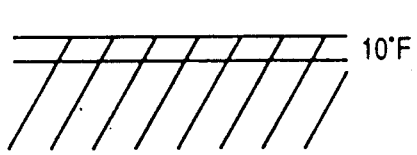

An example of a refrigeration system 10 operating in accordance with the present invention is described as follows with reference to FIG. 2 which illustrates the ranges of operation of the modes: The system is designed to deliver air at 45° F. from the evaporator. The system may be capable of cooling full evaporator heat load in the third mode at condenser fluid temperatures of 10° F. and below, i.e. the condenser temperature is $\leq 10°$ F. Thus, the second temperature difference is 35° F. For the same 45° F. evaporator temperature, the system may require compressor 12 and bearing pump 26 operation at condenser temperatures greater than 10° F. and may be able to generate sufficient head pressure so that only compressor operation is needed at condenser temperatures greater than 70° F. such that the first temperature difference is $-25°$ F. The second temperature difference is greater than the first temperature difference.

While the invention has been described in terms of its preferred embodiments, it should be understood that numerous modifications may be made thereto without departing from the spirit and scope of the invention as defined in the appended claims. For example, the example of the first and second temperature differences is only illustrative of the invention. It should be understood that the magnitude of the first and second temperatures varies with the system and the environment in which it is intended to be operated. It is intended that all such modifications fall within the scope of the appended claims.

We claim:

1. A refrigeration system having a compressor rotor rotatably supported by a plurality of hydrodynamic bearings lubricated by oiless pressurized liquid refrigerant and pressurizing refrigerant which flows to a condenser providing liquid refrigerant which flows to an evaporator in fluid communication with the condenser and the compressor comprising:

a refrigerant circuit, coupled to the compressor, for providing pressurized liquid refrigerant to the hydrodynamic bearings from the compressor and to the evaporator;

a bearing pump, coupled to the refrigerant circuit and to the condenser, for providing pressurized refrigerant to the refrigerant circuit;

a first temperature sensor sensing a temperature Tsink of a heat exchange fluid at the condenser and providing a temperature signal representative of the temperature Tsink of the heat exchange fluid at the condenser;

a second temperature sensor sensing a temperature Tsource of a heat exchange fluid at the evaporator and providing a temperature Tsource signal representative of the temperature of the heat exchange fluid at the evaporator; and a controller, coupled to the temperature sensors, for controlling activation of the compressor, and bearing pump as a function of the temperature signals representative of Tsink and Tsource to provide for three modes of operation with the first mode of operation being activation of only the compressor, the second mode of operation being activation of the bearing pump and the compressor and the third mode of operation being activation of only the bearing pump.

2. A refrigeration system in accordance with claim 1 wherein:

the first mode of operation occurs when (Tsource−Tsink)<TDiFF1 with TDiFF1 being a temperature difference.

3. A refrigeration system in accordance with claim 1 wherein:

the second mode of operation occurs when TDiFF1≦(Tsource−Tsink)<TDiFF2 with TDiFF1 being a first temperature difference and TDiFF2 being a second temperature difference.

4. A refrigeration system in accordance with claim 1 wherein:

the third mode of operation occurs when (Tsource−Tsink)≧TDiFF2 with TDiFF2 by a temperature difference.

5. A refrigeration system in accordance with claim 1 wherein:

the first mode of operation occurs when (Tsource−Tsink )<TDiFF1;

the second mode of operation occurs when TDiFF1≦(Tsource−Tsink)<TDiFF2; and the third mode of operation occurs when (Tsource−Tsink)≧TDiFF2; and TDiFF1 is a first temperature difference and TDiFF2 is a second temperature difference.

6. A refrigeration system having a compressor rotor rotatably supported by a plurality of hydrodynamic bearings lubricated by oiless pressurized liquid refrigerant and pressurizing refrigerant which flows to a condenser providing liquid refrigerant which flows to an evaporator in fluid communication with the condenser and the compressor comprising:
a refrigerant circuit, coupled to the compressor, for providing pressurized liquid refrigerant to the hydrodynamic bearings from the compressor and to the evaporator;
a bearing pump, coupled to the refrigerant circuit and to the condenser, for providing pressurized refrigerant to the refrigerant circuit;
a first temperature sensor sensing a temperature Tsink of a heat exchange fluid at the condenser and providing a temperature signal representative of the temperature Tsink of the heat exchange fluid at the condenser;
a second temperature sensor sensing a temperature Tsource of a heat exchange fluid at the evaporator and providing a temperature signal representative of the temperature Tsource of the heat exchange fluid at the evaporator; and
a controller for controlling activation of the compressor and bearing pump as a function of the temperature signals representative of Tsink and Tsource and providing a mode of operation with only the bearing pump being activated to cause refrigerant to flow through the evaporator.

7. A refrigeration system in accordance with claim 6 wherein:
the mode of operation occurs when (Tsource−Tsink)≧TDiFF2 with TDiFF2 by a temperature difference.

8. A method of operating a refrigeration system having a compressor rotor rotatably supported by a plurality of hydrodynamic bearings lubricated by pressurized liquid refrigerant provided from at least one of a bearing pump and the compressor rotor and pressurizing refrigerant which flows to the condenser providing liquid refrigerant which flows to an evaporator in fluid communication with the condenser and the compressor comprising:
sensing a first temperature Tsink of a heat exchange fluid at the condenser;
sensing a second temperature Tsource of a heat exchange fluid at the evaporator; and
controlling activation of the bearing pump and the compressor as a function of the temperatures Tsink and Tsource to provide three modes of operation with the first mode of operation being activation of only the compressor, the second mode of operation being activation of the bearing pump and the compressor and the third mode of operation being activation of only the bearing pump.

9. A method in accordance with claim 8 wherein:
the first mode of operation occurs when (Tsource−Tsink)<TDiFF1 with TDiFF1 being a temperature difference.

10. A method in accordance with claim 8 wherein:
the second mode of operation occurs when TDiFF1≦(Tsource−Tsink)<TDiFF2 with TDiFF1 being a first temperature difference and TDiFF2 being a second temperature difference.

11. A method in accordance with claim 8 wherein:
the third mode of operation occurs when (Tsource−Tsink)≧TDiFF2 with TDiFF2 being a temperature difference.

12. A method in accordance with claim 10 wherein:
the first mode of operation occurs when (Tsource−Tsink)<TDiFF1;
the second mode of operation occurs when TDiFF1≦(Tsource−Tsink)<TDiFF2; and
the third mode of operation occurs when (Tsource−Tsink)≧TDiFF1; and
TDiFF1 is a first temperature difference and TDiFF2 is a second temperature difference.

13. A method of operating a refrigeration system having a compressor rotor rotatably supported by a plurality of hydrodynamic bearings lubricated by pressurized liquid refrigerant provided from at least one of a bearing pump and the compressor rotor and pressurizing refrigerant which flows to the condenser providing liquid refrigerant which flows to an evaporator in fluid communication with the condenser and the compressor comprising:
sensing a first temperature Tsink of a heat exchange fluid at the condenser;
sensing a second temperature Tsource of a heat exchange fluid at the evaporator; and
controlling activation of the bearing pump and the compressor as a function of the temperatures Tsink and Tsource and providing a mode of operation with only the bearing pump being actuated to cause refrigerant to flow through the evaporator to cool the heat exchange fluid at the evaporator.

14. A method in accordance with claim 13 wherein:
the mode of operation occurs when (Tsource−Tsink)≧TDiFF2 with TDiFF2 by a temperature difference.

15. A refrigeration system in accordance with claim 1 wherein:
the compressor is a multiple stage compressor; and further comprising
a first subcooler and a first expansion valve contained in the refrigerant circuit, the first expansion valve expanding refrigerant flowing from the first subcooler to cool refrigerant flowing through the first subcooler and refrigerant flowing from the first subcooler after expansion by the first expansion valve flowing to an interstage point in the compressor through which compressed gas from one stage flows to another stage.

16. A refrigeration system in accordance with claim 15 wherein:
the refrigerant flows through the refrigerant circuit from the first subcooler after being cooled by the subcooler to the hydrodynamic bearings.

17. A refrigeration system in accordance with claim 16 further comprising:
a second subcooler and a second expansion valve contained in the refrigeration circuit which receive liquid refrigerant flowing from the first subcooler, the second expansion valve expanding refrigerant flowing from the second subcooler to cool refrigerant flowing through the second subcooler and refrigerant flowing from the second subcooler after cooling by the second subcooler flowing to the hydrodynamic bearings and then to the evaporator and the expanded refrigerant flowing from the second subcooler flowing to an inlet of the compressor; and wherein
the refrigerant is a non-azeotropic binary refrigerant.

18. A refrigeration system in accordance with claim 2 wherein:

only the bearing pump is activated under the control of the controller when (Tsource−Tsink)≧TDiFF2 with TDiFF2 being a temperature difference.

19. A refrigeration system in accordance with claim 18 wherein:

the compressor is a multiple stage compressor; and further comprising a first subcooler and a first expansion valve contained in the refrigerant circuit, the first expansion valve expanding refrigerant flowing from the first subcooler to cool refrigerant flowing through the first subcooler and refrigerant flowing from the first subcooler after expansion by the first expansion valve flowing to an interstage point in the compressor through which compressed gas from one stage flows to another stage.

20. A refrigeration system in accordance with claim 19 wherein:

the refrigerant flows through the refrigerant circuit from the first subcooler after being cooled by the subcooler to the hydrodynamic bearings.

21. A refrigeration system in accordance with claim 3 wherein:

only the bearing pump is activated under the control of the controller when (Tsource−Tsink)≧TDiFF2 with TDiFF2 by a temperature difference.

22. A refrigeration system in accordance with claim 21 wherein:

the compressor is a multiple stage compressor; and further comprising a first subcooler and a first expansion valve contained in the refrigerant circuit, the first expansion valve expanding refrigerant flowing from the first subcooler to cool refrigerant flowing through the first subcooler and refrigerant flowing from the first subcooler after expansion by the first expansion valve flowing to an interstage point in the compressor through which compressed gas from one stage flows to another stage.

23. A refrigeration system in accordance with claim 22 wherein:

the refrigerant flows through the refrigerant circuit from the first subcooler after being cooled by the subcooler to the hydrodynamic bearings.

24. A refrigeration system in accordance with claim 6 wherein:

the compressor is a multiple stage compressor; and further comprising a first subcooler and a first expansion valve contained in the refrigerant circuit, the first expansion valve expanding refrigerant flowing from the first subcooler to cool refrigerant flowing through the first subcooler and refrigerant flowing from the first subcooler after expansion by the first expansion valve flowing to an interstage point in the compressor through which compressed gas from one stage flows to another stage.

25. A refrigeration system in accordance with claim 24 wherein:

the refrigerant flows through the refrigerant circuit from the first subcooler after being cooled by the subcooler to the hydrodynamic bearings.

26. A refrigeration system in accordance with claim 7 wherein:

the compressor is a multiple stage compressor; and further comprising a first subcooler and a first expansion valve contained in the refrigerant circuit, the first expansion valve expanding refrigerant flowing from the first subcooler to cool refrigerant flowing through the first subcooler and refrigerant flowing from the first subcooler after expansion by the first expansion valve flowing to an interstage point in the compressor through which compressed gas from one stage flows to another stage.

27. A refrigeration system in accordance with claim 26 wherein:

the refrigerant flows through the refrigerant circuit from the first subcooler after being cooled by the subcooler to the hydrodynamic bearings.

* * * * *